(12) United States Patent
Agostino et al.

(10) Patent No.: US 10,846,461 B2
(45) Date of Patent: *Nov. 24, 2020

(54) SYSTEM AND METHOD FOR PROVIDING CONTENT TO USERS BASED ON INTERACTIONS BY SIMILAR OTHER USERS

(71) Applicant: GROUPON, INC., Chicago, IL (US)

(72) Inventors: Val Agostino, Palo Alto, CA (US); David Cowan, Menlo Park, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/774,639

(22) Filed: Jan. 28, 2020

(65) Prior Publication Data

US 2020/0302110 A1  Sep. 24, 2020

Related U.S. Application Data

(63) Continuation of application No. 16/121,904, filed on Sep. 5, 2018, now Pat. No. 10,592,592, which is a continuation of application No. 15/288,540, filed on Oct. 7, 2016, now Pat. No. 10,114,803, which is a continuation of application No. 13/470,338, filed on May 13, 2012, now Pat. No. 9,489,352.

(60) Provisional application No. 61/518,937, filed on May 13, 2011.

(51) Int. Cl.
| | | |
|---|---|---|
| G06F 7/04 | (2006.01) |
| G06F 40/134 | (2020.01) |
| G06F 16/951 | (2019.01) |
| G06F 16/954 | (2019.01) |
| G06F 16/958 | (2019.01) |
| G06F 16/735 | (2019.01) |
| G06F 40/14 | (2020.01) |
| G06F 40/103 | (2020.01) |
| G06F 16/955 | (2019.01) |
| G06F 3/0483 | (2013.01) |

(52) U.S. Cl.
CPC .......... *G06F 40/134* (2020.01); *G06F 16/735* (2019.01); *G06F 16/951* (2019.01); *G06F 16/954* (2019.01); *G06F 16/958* (2019.01); *G06F 16/9566* (2019.01); *G06F 40/103* (2020.01); *G06F 40/14* (2020.01); *G06F 3/0483* (2013.01)

(58) Field of Classification Search
CPC .. G06F 40/134; G06F 40/103; G06F 16/9566; G06F 16/958; G06F 16/954; G06F 16/951; G06F 16/735; G06F 40/14; G06F 3/0483
USPC ................................ 715/733, 734, 744, 207
See application file for complete search history.

(56) References Cited

U.S. PATENT DOCUMENTS

| | | | |
|---|---|---|---|
| 6,681,247 B1 | 1/2004 | Payton | |
| 7,467,349 B1 * | 12/2008 | Bryar | .................. G06F 16/9577 715/205 |
| 8,224,773 B2 | 7/2012 | Spiegel | |
| 8,615,442 B1 | 12/2013 | Kapur et al. | |

(Continued)

*Primary Examiner* — Scott T Baderman
*Assistant Examiner* — Hassan Mrabi
(74) *Attorney, Agent, or Firm* — Alston & Bird LLP

(57) ABSTRACT

A system and method indicates certain terms on a web page as links or portals to additional information and then allows the user to click the link or operate the portal to obtain the additional information, which may be a different web page on the world wide web.

17 Claims, 6 Drawing Sheets

(56) References Cited

U.S. PATENT DOCUMENTS

| | | |
|---|---|---|
| 8,631,078 B2 | 1/2014 | Wherry et al. |
| 8,700,640 B2 | 4/2014 | Shivashankar et al. |
| 8,825,705 B2 | 9/2014 | Thayne et al. |
| 9,065,727 B1 | 6/2015 | Liu et al. |
| 9,083,670 B1 | 7/2015 | Boncha et al. |
| 9,715,533 B2 * | 7/2017 | Lam .................. G06F 16/9024 |
| 2004/0039779 A1 * | 2/2004 | Amstrong ......... H04M 3/42229 709/204 |
| 2005/0027802 A1 * | 2/2005 | Madsen ................ G06Q 10/10 709/204 |
| 2005/0149498 A1 | 7/2005 | Lawrence et al. |
| 2006/0004799 A1 * | 1/2006 | Wallender ........... G06F 16/9562 |
| 2007/0050711 A1 * | 3/2007 | Walker ................ G06F 16/986 715/205 |
| 2009/0055435 A1 | 2/2009 | Kiviluoto et al. |
| 2009/0150514 A1 | 6/2009 | Davis et al. |
| 2009/0199230 A1 * | 8/2009 | Kumar ............... G06Q 30/0268 725/32 |
| 2009/0222551 A1 * | 9/2009 | Neely .................. G06F 16/951 709/224 |
| 2010/0005518 A1 | 1/2010 | Tirpak et al. |
| 2010/0262570 A1 | 10/2010 | Tateno et al. |
| 2011/0029543 A1 | 2/2011 | Graham et al. |
| 2011/0029564 A1 | 2/2011 | Graham et al. |
| 2011/0060738 A1 | 3/2011 | Gates et al. |
| 2011/0258042 A1 | 10/2011 | Purvy et al. |
| 2012/0166452 A1 | 6/2012 | Tseng |
| 2012/0185892 A1 | 7/2012 | Camplejohn et al. |
| 2012/0215773 A1 | 8/2012 | Si et al. |
| 2012/0215846 A1 * | 8/2012 | Howes .................. G06Q 10/10 709/204 |
| 2013/0046770 A1 | 2/2013 | Tseng |
| 2013/0124298 A1 | 5/2013 | Li et al. |
| 2013/0173582 A1 * | 7/2013 | Liao ................ G06F 16/248 707/709 |
| 2014/0074629 A1 * | 3/2014 | Rathod ............. G06Q 30/0277 705/14.73 |
| 2015/0271166 A1 | 9/2015 | Paxton et al. |

* cited by examiner

SYSTEM AND METHOD FOR PROVIDING CONTENT TO USERS BASED ON INTERACTIONS BY SIMILAR OTHER USERS

CROSS-REFERENCE TO RELATED APPLICATIONS

This application is a continuation of U.S. patent application Ser. No. 16/121,904, which was filed Sep. 5, 2018, and originally entitled "System and Method for Providing Content to Users Based on Interactions by Similar Other Users," which is a continuation of U.S. patent application Ser. No. 15/288,540, which was filed Oct. 7, 2016, and originally entitled "System and Method for Providing Content to Users Based on Interactions by Similar Other Users", which is a continuation of U.S. patent application Ser. No. 13/470,338, which was filed on May 13, 2012, and originally entitled "System and Method for Providing Links to Content to Users based on Similar Other Users", which claims the benefit of U.S. Provisional Patent Application Ser. No. 61/518,937, which was filed on May 13, 2011 and entitled "Method and Apparatus for Providing Content to Users Based on Web Pages They and Others Visit".

The entirety of the disclosures of each of the above-referenced applications is hereby incorporated by reference for all purposes.

FIELD OF THE INVENTION

The present invention is related to computer software and more specifically to computer software for customizing web pages.

BACKGROUND OF THE INVENTION

Web pages contain text and links inserted by the author of the web page. However, the links are not customized for each user who views the web page, making them less personalized for that user. What is needed is a system and method that can provide links that are customized for each user that can be of additional interest to each particular user of a web page.

SUMMARY OF INVENTION

A system and method uploads from a client to a server the URLs of web pages being visited by a user. For each URL received, the server retrieves the web page and for each page, identifies other web pages corresponding to terms used on the web page being viewed by the user, and provides URLs to the other web pages for such terms to the client. The client inserts links to such other pages in the web page being viewed by the user and causes terms on the web page with which the user can interact to reach such other web pages to be displayed in a format different from that used by the author of the page, either as a result of the link insertion or using other techniques.

The other web pages that are of interest to a user may be selected from among a set of web pages that correspond to the terms on the web page being viewed by the user.

The other web pages are selected in part based on how interesting to the user the term to which the web page corresponds is predicted to be, based on the user's experience with such terms and other user's actions regarding such terms, where the other users may be those that are similar to the user.

The other web pages are also selected in part based on how relevant the other page is to the web page being viewed by the user, and for other qualities of the other pages.

The other web pages are also selected in part based on the degree to which the user is predicted to find the web page of interest, based not only on information known about the user, but also the actions of other users, such as those at least similar to the user viewing the web page.

The terms that get selected to be linked may be constrained, for example, ensuring that they are limited in number and spread throughout the page and not too close to one another, and the pages that get selected may also be constrained, for example, by limiting them to a maximum number and also limiting maximum numbers of types of pages.

DETAILED DESCRIPTION OF A PREFERRED EMBODIMENT

1. Conventional Computer Systems.

Figure 1:
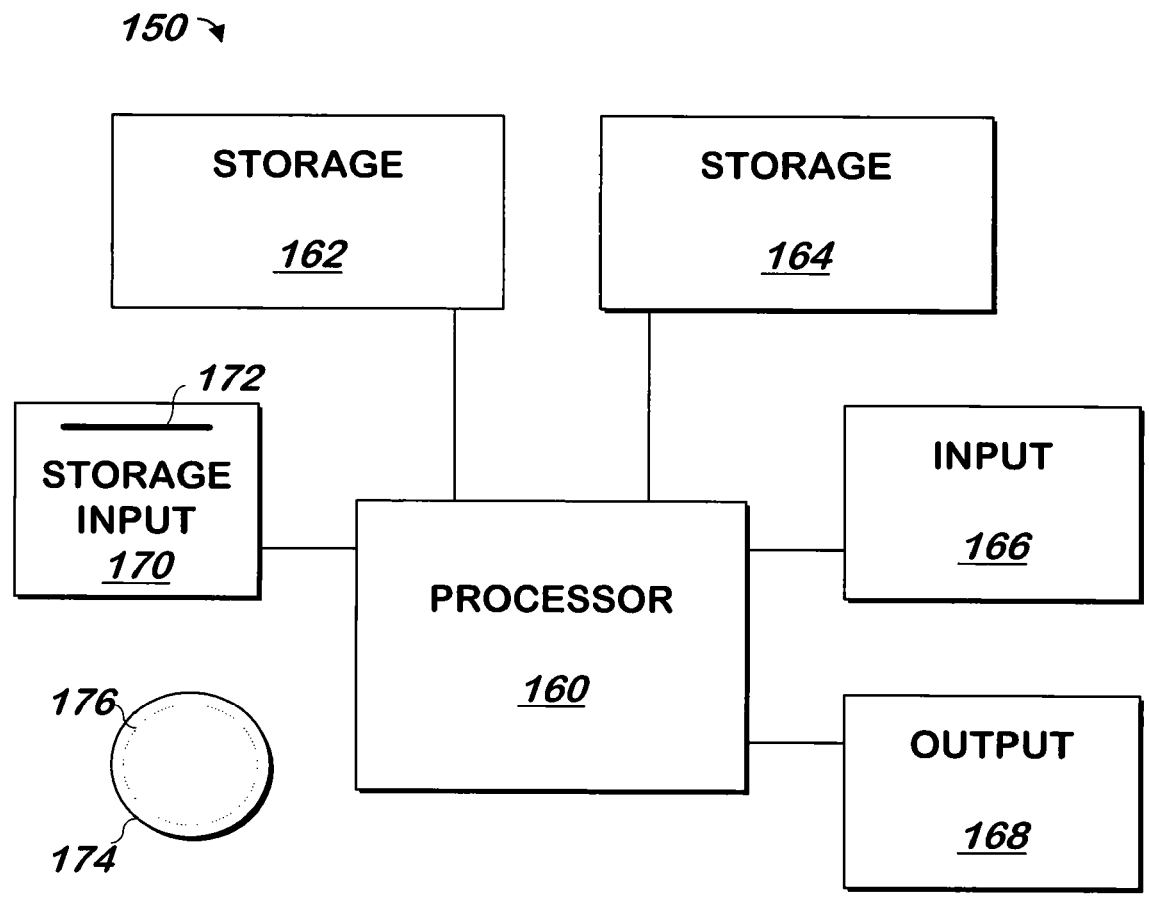
FIG. 1 is a block schematic diagram of a conventional computer system.

The present invention may be implemented as computer 20 software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS SPARC ENTERPRISE M9000 SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as 95, 98, Me, XP, NT, 2000, 7 or VISTA) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif., the CHROME browser commercially available from Google, Inc. of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. or an iPhone commercially available from APPLE, INC of Cupertino, Calif., though other systems may be used. Various computer systems may be employed, with the various computer systems communicating with one another via the Internet, a conventional cellular telephone network, an Ethernet network, or all of these.

2. Display of Additional Information to a Web Page.

Figure 2:
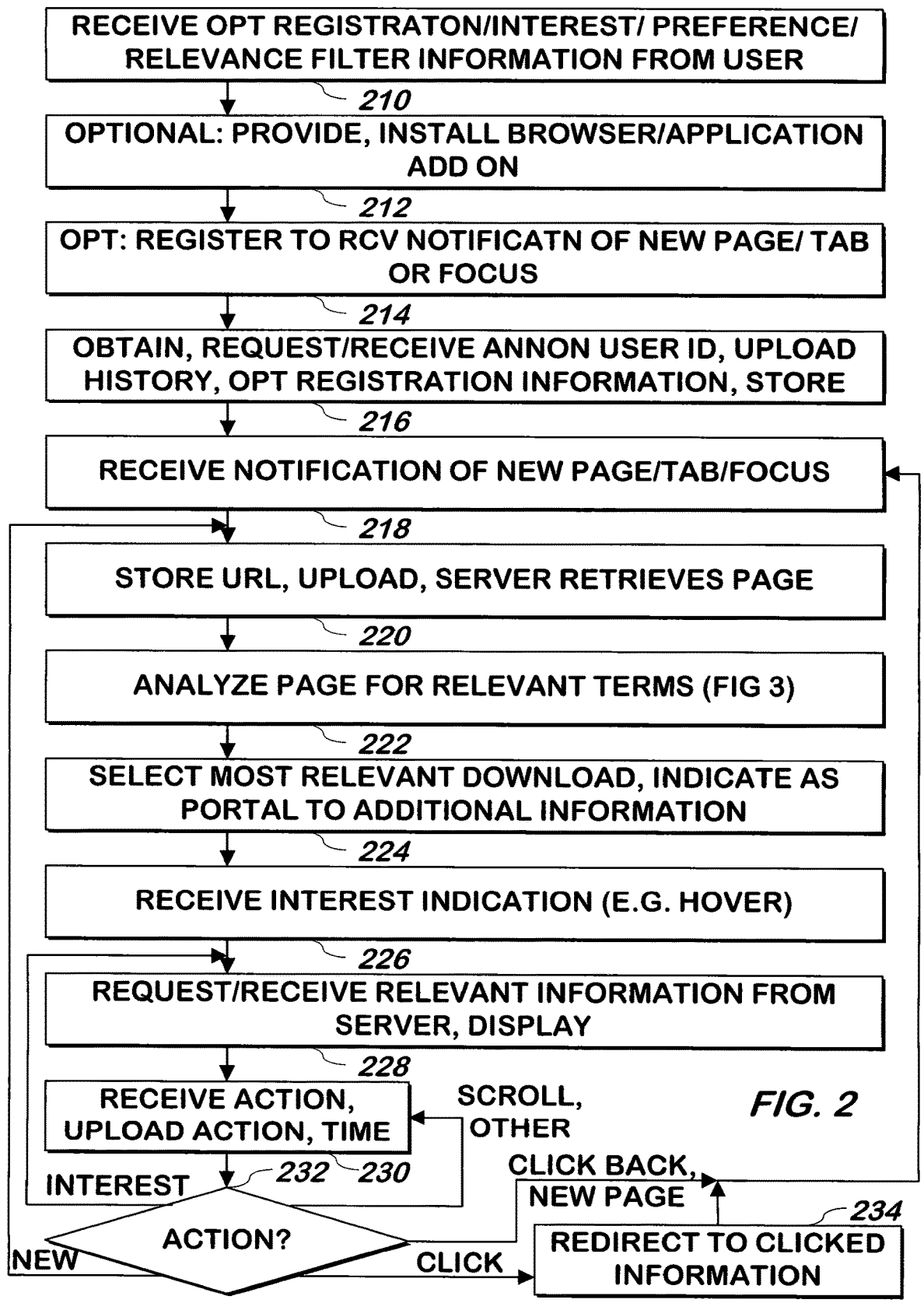
FIG. 2 is a flowchart illustrating a method of adding information to a web page viewed by a user according to one embodiment of the present invention.

Referring now to FIG. 2, a method of adding links to web pages is shown according to one embodiment of the present invention. A user may optionally register 210 to a server (or at a later time to a program running on the user's computer system, with the registration information uploaded by that program to the server), for example by providing information about the user and that user's interests and preferences. The server is coupled to the user's client computer system via a network such as the Internet. Information about the user may include demographic information such as age, and sex, zip code, and other similar information. Such information about the user may include any information that allows other users who have similar characteristics (e.g. other users in the same age range as the user) to be associated with that user. Interest and preference information may include information about the user's interests, such as by selecting five interests from among 25 possible interests, with the user's preferences being implied to be those the user has selected being preferred over those the user has not selected. Among the interests the user selects, the user may rank the interests, which defines the user's preference of such ranked interests relative to one another. Other conventional interest and preference information may be received from the user.

A browser add on or application add on or enhancement that operates as described below may be optionally provided and installed 212, for example, in the user's browser. The techniques described herein may be used without a browser or application or the techniques may be incorporated into the operation of the browser itself, without separately adding such functionality into a browser as an add on, extension, browser application, etc.

One or more requests may be optionally provided 214 to receive notification of a new web page being loaded by a browser or application, for example, or the user clicking on a new tab or the browser or application losing focus. In one embodiment, such request is inherent in step 212, and in another embodiment, the request is made explicitly, for example, to a browser, application or operating system. In still another embodiment, such as when the method of the present invention is built into a browser, no explicit request is made, but the browser will provide such information to the system and method of the present invention as part of its operation. In one embodiment, a user specifies each web page requested to the system and method and so no notification is required.

In one embodiment, some of the steps of the method of the present invention may be performed on a server, coupled to multiple client computer systems via the Internet. The client computer systems receive information from the user and the browser or application and upload it to the server. For each client computer system, the server processes the information and instructs the client computer system how to modify the web page as described herein and the client computer system so modifies the web page. In such embodiment, the client requests from the server a unique user identifier and stores it to be sent with all subsequent communications to the server and the server issues a unique user identifier to the client, which the server and client each store 216.

In one embodiment, step 216 includes uploading history information for that user. History information may include pages the user has visited and searches terms the user used when performing searches through a search bar on the browser or other application or when using a conventional search page.

A notification of a new page is received 218, for example, from the user's browser. The notification is provided when the user specifies a new web page to view, in the address bar, via a favorite link, or via a link or button on a web page previously displayed. The notification may also be provided when the user switches tabs to view a web page already viewed or when the user changes focus to, or away from, an application, such as a browser, that is displaying a web page. The URL may be locally stored and is also uploaded to a server along with any search terms the user used to reach the page, and the server retrieves the web page corresponding to the URL it received 220, as a browser would. In one embodiment, the server may check a cache of web pages that it has recently retrieved for that user or another user and may use the web page from the cache if the web page is within a threshold amount of time or the date and time specified by an Expires header supplied with the web page. If the page is in the cache and the current time is not past the threshold time or the Expires time, the page is retrieved from the cache instead of retrieving it from the source. The server analyzes 222 the page to identify relevant terms on the page as described below with respect to FIG. 3, and the server selects the most relevant terms and provides them via a network such as the Internet to the 5 client computer system. Because the same term may be on the web page several times, in one embodiment, the server also provides an indication of the instance of the term on the page, though in another embodiment, no such instance indication is provided and all instances may be used as portals or links to additional information as described herein, or the client may select one at random or in a manner that spreads each instance as far away from the other terms used as portals or links to additional information as possible.

When it receives such information, the client causes the terms on the web page to be portals or links to additional information as described below. Terms that are portals or links to additional information may be displayed at the client computer system using different formatting from that used by the author of the page, either because they have been converted to links that the browser will display using different formatting or otherwise. The client instruments the web page to cause interest indications or clicks of the terms indicated as being portals or links to additional information or other areas to be processed as described below and the web page instrumented and indicated in this manner is redisplayed (or the initial display may be delayed until the web page is so instrumented and indicated, and is displayed with the reformatting and instrumentation) 224.

In one embodiment, the terms may be provided by the server to the client with an indication of the degree of relevance to the user of the terms and the client computer system will indicate the terms as being a portal or link to additional information differently, e.g. in different color, or with a different icon, or using other differences, according to their degree of relevance.

In one embodiment, a term may be indicated as being a portal or link to additional information by underlining it, and in another embodiment, a term may be indicated as being a portal or link to additional information by shading the white space around it. In still another embodiment, a term may be indicated as being a portal or link to additional information by displaying it in a different color. In one embodiment, no change in appearance for a term indicated as being a portal or link to additional information occurs until the user does something like hover the mouse cursor over the term for at least a minimum period of time, like three quarters of a second, and in still another embodiment, a term indicated as being a portal or link to additional information is displayed using another conventional method of displaying information in a distinctive manner.

In one embodiment, the client computer system will not provide the URL of a page containing search results, as indicated by the URL, but will strip the search terms from the URL parameter passing information in the URL and provide it to the server when the user clicks on one of the links in the search results page. If the client does not click on a link, the search term either may be provided to the server at a later time, or not provided to the server. In another embodiment, as part of step 222, the server identifies whether the page contains a set of search results based on the URL of the page and optionally the URL parameter passing information to the right of the base URL of the web page. If the page contains a set of search results, the server stores the search term as described above but otherwise does not perform step 222 and step 224 is not performed.

At any time, the user may provide an interest indication, indicating interest in a term indicated as being a portal or link to additional information for example, by hovering over or very near such a term for at least a minimum threshold amount of time (e.g. one half second or one second) and such interest indication is received at the client computer system 226. When such an interest indication is received, the client computer system requests from the server, information relevant to the term corresponding to the interest indication, for example, by providing the text of the term indicated as being a portal or link to additional information and the user identifier, and such relevant information is provided by the servers received by the client and displayed by the client computer system 228.

In one embodiment, the relevant information is information that describes in some way the information the user will see if the user clicks the term indicated as being a portal or link to additional information. For example, the relevant information may include information from the URL corresponding to a link that is activated when the user clicks the term indicated as being a portal or link to additional information, and a title, image, icon or summary of the information contained in the web page corresponding to that link.

Some or all of the relevant information (i.e. the information relevant to the term indicated as being a portal or link to additional information) may be displayed in any of a variety of ways. The relevant information may be displayed in a tool bar, as a small pop up window just above (or otherwise near) the term indicated as being a portal or link to additional information and corresponding to the interest indication, or elsewhere. The relevant information may be displayed in the status bar of a browser, or other similar component of a different application. Other conventional means of displaying the relevant information may be used.

For example, a web page the user is viewing may be a web page discussing current nominations for the GRAMMY AWARDS. One of the nominees may be Britney Spears, and such term may be indicated as being a portal or link to additional information as described herein. If the user provides an interest indication for that term, relevant information about a link to more information about that term is displayed. For example, the relevant information may be the words: "en.wikipedia.org: Britney Spears", where 'Wikipedia.en' is a portion of the URL to the English language version of Wikipedia.com, and Britney Spears is the title of the page the user's browser will request if the user clicks on the term indicated as being a portal or link to additional information.

In one embodiment, the relevant information may include information provided by the author of the page to which the term is, or will be, linked. For example, the relevant information may include a message or set of phrases or both, each provided by or on behalf of the page to which the term is or will be linked. In one embodiment, the display of the relevant information may be interactive and allow the user to choose from among multiple different sources of information that may be used as the link described below. For example, if the user right clicks the display of the relevant information, additional relevant information is displayed. The additional relevant information includes other information corresponding to the term indicated as being a portal or link to additional information, such information being retrieved from the server when the user right clicks the term indicated as being a portal or link to additional information. For example, the additional relevant information may be the following phrases, each corresponding to a different link: "Britney Spears Concert Tickets", "Britney Spears Music", "Britney Spears Photos". Icons may be used instead of the words to indicate the type of information. A relevance score may be displayed with each icon or phrase to indicate the degree of relevance of the information to the term the user will see if the user clicks the phrase or icon.

The user may select the phrase from the relevant information in which the user is interested and the link corresponding to the selected relevant information phrase will be used when the user clicks it as described below. If the user does not select a different phrase, the first phrase or icon or a default phrase or icon is used for the link as described below. This technique may be performed as part of step 228.

In one embodiment, the relevant information received from the server also contains at least one URL to a web page the user can view if they click on the term indicated as being a portal or link to additional information or phrase or icon. In the embodiment in which the user may select a phrase of the relevant information, the relevant information may contain a URL for each such phrase or icon, or when a phrase or icon is selected, the client computer system provides the identifier assigned as described above and an indication of the phrase or icon selected and the server provides the link that corresponds to that phrase or icon as part of step 228.

At any time, the user may perform an action and an indication of the action is received, and uploaded by the client to the server, along with the user identifier and the server timestamps and stores such information for use as described herein 230. The action may be to select a new page, new tab or change the focus, and the browser or other application so indicates and the indication is received, in which case 232 the method continues at step 218. The action may be to provide an interest indication which the browser or other application communicates, in which case 232 the method continues at step 228. The action may be to click on a term indicated as being a portal or link to additional information and the browser or other application receives the click and provides an indication of the clicked term to the system and method of the present invention, in which case 232 the method continues at step 234. The action may be to scroll up or down or page up or down, hover over a link, move the mouse around the page, interact with a web form (e.g. making a selection, pushing a button, typing in the form, etc) or another indication that the user is or is not reviewing or interacting or is otherwise engaging with the page being displayed, and the browser or other application communicates the action, in which case 232 the method continues at step 230.

At step 232, the user's browser or other application is redirected to the URL associated with the relevant information for the link and the method continues at step 218.

As noted, in the case of each action, such action is recorded and uploaded by the client to the server with the user identifier issued as described above and the server stores such information along with the date and time of receipt. This allows the server to identify what a user does with each web page or other sets of information the user receives. The amount of time between actions can also provide an indication regarding whether the user found the information useful or not.

3. Identifying the Terms to Indicate as being a Portal or Link to Additional Information and the Web Pages to Link to the Terms.

Figure 3A:
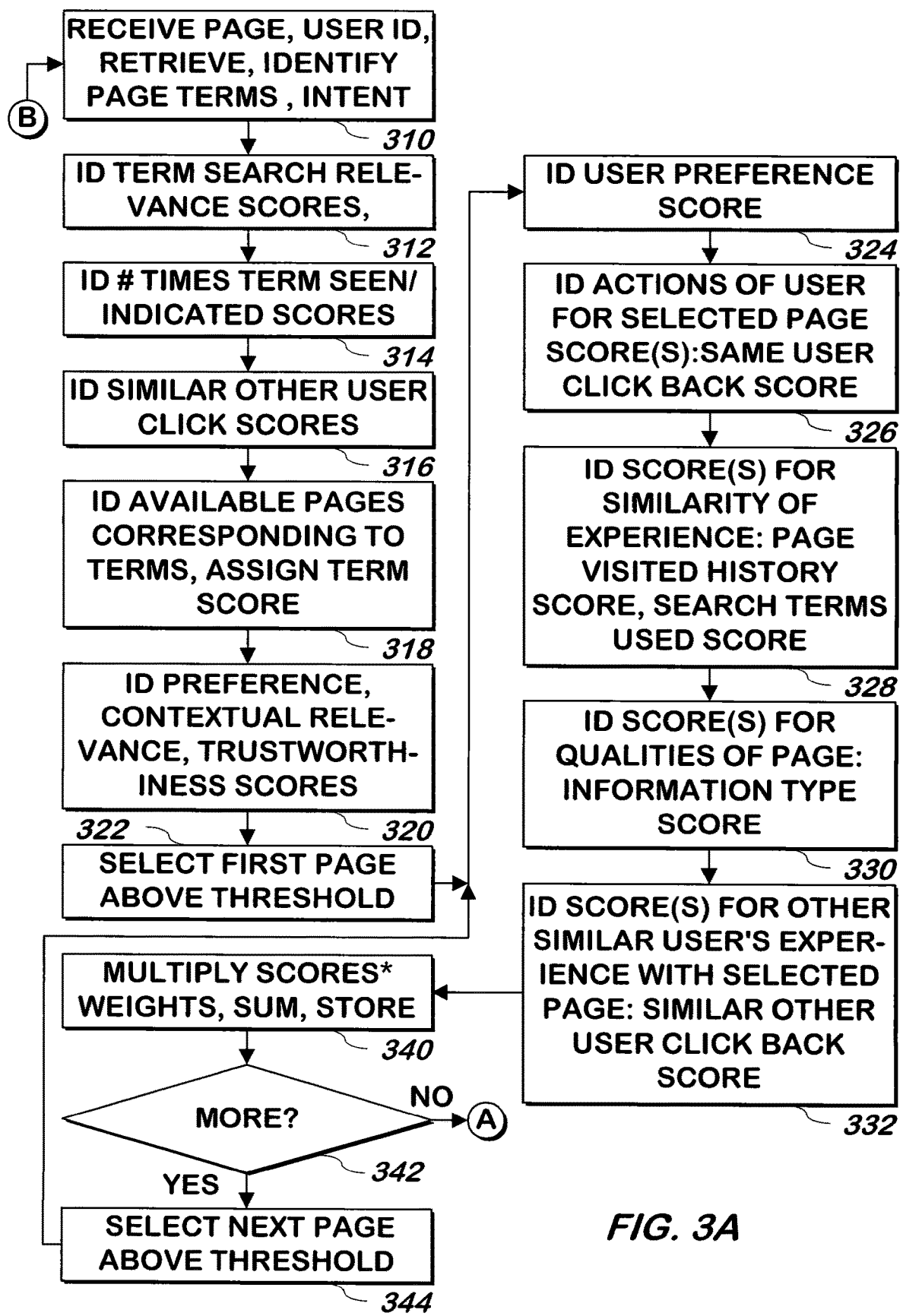
FIGS. 3A and 3B, are a flowchart illustrating a method of identifying information to add to a web page viewed by a user according to one 10 embodiment of the present invention.
Figure 3B:
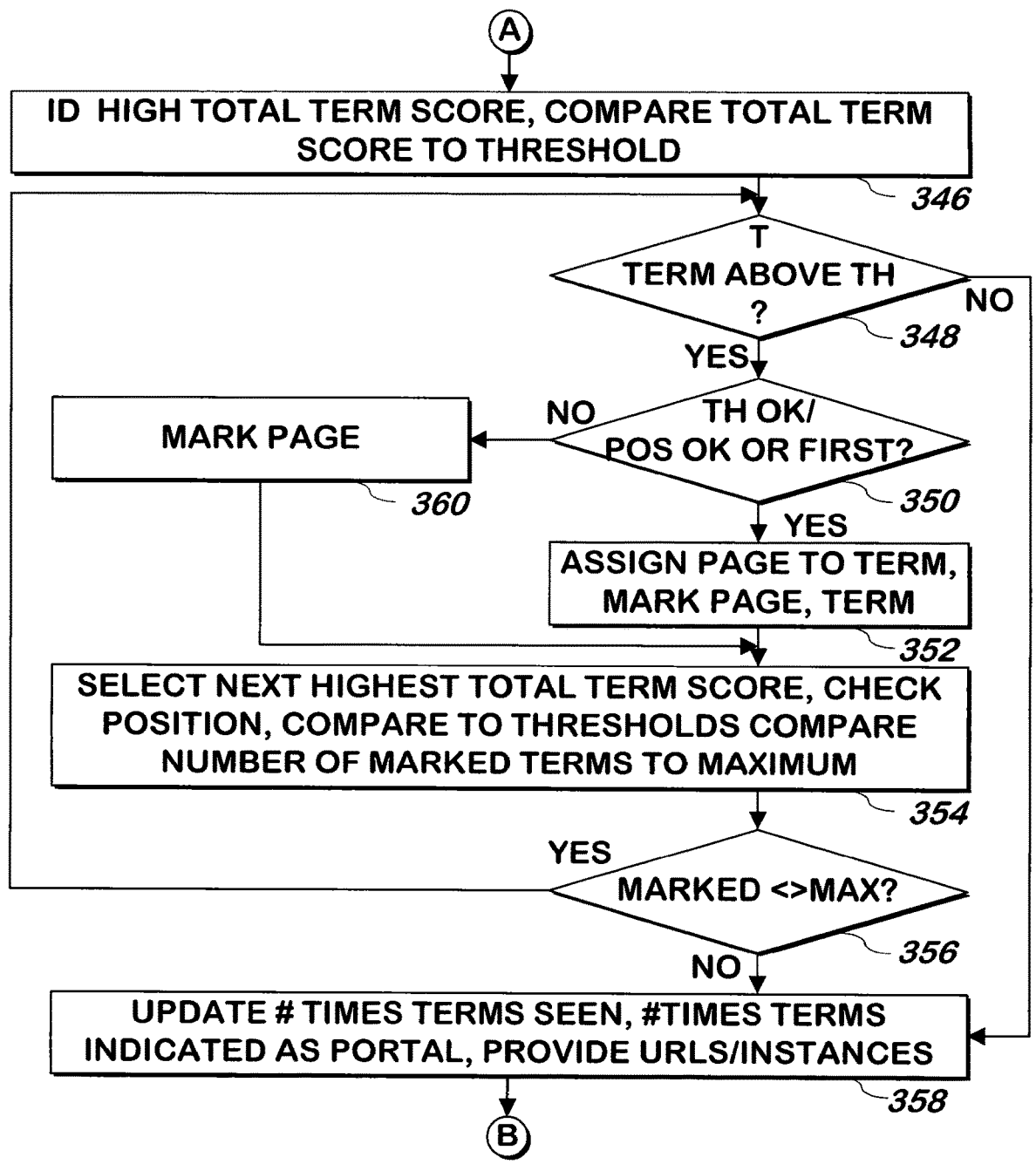

Referring now to FIG. 3, consisting of FIGS. 3A and 3B, a method of identifying information to add to a web page is shown according to one embodiment of the present invention.

A. Retrieve Web Page, Identify Terms, Intent.

A user identifier and URL of a web page is received, the page is retrieved and terms on the page are identified 310. For example, the every combination of one, two, three, four, five or six consecutive words not separated by certain punctuation (e.g. a comma, semicolon, period followed by two spaces, while allowing for the words "Dr. Jim Jones" to be a term) on the page and not part of a link or an HTML tag or attribute (e.g. in the tag "<strike>", the word 'strike' is ignored) may be identified as a term on the page, though other types of terms may be used. In one embodiment, terms may overlap. For example, in a group of consecutive words, the first three and the last three words may be two different terms, the first two words may correspond to a third term, and so on.

In one embodiment, an intent is identified from among several potential intents as part of step 310. The intent may not be the actual intent of the user, but may indicate the intents of many users or most users browsing that page. Intent indicates what the user might be trying to do when viewing a web page. For example, if the user is on a travel web site that sells travel services on a page in which travel services may be browsed or ordered, the intent of the user may be identified as being "purchase". If the user is on a travel web site that provides information, the intent of the user may be "information gathering". Other intents may be "entertainment", "review of reference material" and so on. The intent of the user may be determined using the URL of the page, and words on the page. The domain of the URL may be looked up in a database that may provide an indication of possible intents for pages in the domain, and then the words of the page may be used to distinguish among the possible intents if more than one exists.

For example, the domain expedia.com may have only one intent: purchase. A vacation web site that both provides information and allows a purchase may have both "information gathering" and "purchase" intents, with the content of the page being used to discern from among the two intents. A page in this web site that uses the words "add to cart" may indicate that the intent is "purchase" for that page.

B. Assign Other Scores to the Terms on the Retrieved Page.

1. Score Based on the Relevance of the Terms to User's Prior Actions Not Directly Related to the Terms.

One or more scores may be identified for each term resulting actions the user has taken that were not necessarily performed in the presence of the term. One such score is a term search relevance score.

A term search relevance score is identified 312 for each term identified as described above. The term search relevance score is higher if the term contains words or synonyms of words from recent searches than it is if the term has no words or synonyms from recent searches performed by the user. In one embodiment, the term search relevance score is higher if such correspondence with search terms is more recent than it is if the search terms to which the term corresponds were less recently used by the user. In one embodiment, the term search relevance score is higher if the term has a greater percentage of words that match or correspond (e.g. via a synonym table) to the recent search terms than it does if a lesser percentage of words of the term match or correspond to recent search terms. In one embodiment, the search term relevance score has a higher value if the term corresponds to many recent search terms than it does if the term corresponds to few recent search terms. The term search relevance score is a score based on an action that the user took that was not necessarily performed in the presence of the term, because it may be positively related to the term without the user being in the presence of the term when the user thinks of the search to take the action. The search term the user uses need not be displayed anywhere at the time the user thinks to use it. Such a score is referred to as a "sinepresence score" because neither the term nor an inventory page need be visible to the user when the user decides to perform the action on which the score is evaluated.

At this point, in one embodiment, what is assigned to the retrieved page is an intent, and a term search relevance score for each term identified. This may be written in short hand as: Retrieved Page (intent); Each Term (term search score). It is noted that scores may be assigned in other orders than the order described here.

2. Score Based on the User's Prior Experience With Each Term.

For each term on the page, a score corresponding to the number of times such term has been seen on web pages whose URLs were uploaded by the client corresponding to the user identifier received is identified and a score corresponding to the number of times the term indicated as being a portal or link to additional information was displayed to the user corresponding to the user identifier received from the client is also identified 314. The "number of times the term was seen by the user score" is higher if such term has been seen by that user fewer times and lower if such term has been seen by the user a higher number of times. The "number of times the term indicated as being a portal or link to additional information was displayed to the user score" is higher if such term has been seen by that user when it was displayed indicated as being a portal or link to additional information fewer times and lower if such term has been seen by the user when it was indicated as being a portal or link to additional information a higher number of times.

In one embodiment, step 314 may also include identifying an "interest indication score" for each term. An interest indication score is higher if the user, when presented with the term indicated as being a portal or link to additional information, provided an interest indication such as hovering above it for more than a threshold amount of time more frequently and is lower if the user, when presented with the term indicated as being a portal or link to additional information, provided an interest indication such as hovering above it for more than a threshold amount if time less frequently.

Thus, in one embodiment, what is assigned to the retrieved page and terms are: Retrieved Page (intent); Each Term (term search score, number of times the term was seen by the user score, interest indication score).

Mash LOGIC

3. Score Based on Other User's Prior Actions with Respect to the Terms.

A similar other user click score is identified for each term on the page 316. The similar other user click score measures the percentage of other users who are similar to the user corresponding to the user identifier received who, when the term was indicated as being a portal or link to additional information, clicked on it causing a web page (which may not necessarily be the selected web page) in the corresponding link to be viewed.

In one embodiment, a similar other user is a user who has similar preferences to the user, similar demographics to the user or any or both of these. In one embodiment, a similar other user is a user who has similar preferences and/or demographics to the user and/or has, within a threshold amount of time (e.g. 1 month), visited the web site containing the page containing the selected term in a number of times that is within the same range as the user having the identifier received. The ranges may be under times in the last week, 6-20 times in the last week, or more than 20 times in the last week, for example. In one embodiment, a similar other user is a user who has similar preferences and or demographics as described above above, but clicks from users who have similar web visit ranges as described above are weighted higher than clicks from other users who don't when computing the score. If the user has not provided preference or demographic information, web sites visit ranges may be used instead to identify similar other users. A threshold match may be employed, for example, a user who has visited at least ten percent of the same web sites as the user whose user identifier was received may be considered a similar user. Thresholds may be determined based on other factors, such as the type of web sites in common.

In one embodiment, instead of or in addition to visiting the same web sites, visits within the same range to the same type of web sites (e.g. financial web sites, sports web sites, etc.) as those visited by the user may be used to identify similar other users. In one embodiment, a database that categorizes web sites according to a user's interests may be used, for example identifying web sites as financial web sites, and other web sites as news web sites and still other sites as other types of web sites.

In one embodiment, a similar other user is a user who not only visits the same web sites or types of web sites a similar number of times, but also exhibits a similar level of engagement with the web site or with some or all of those types of sites. Engagement may be measured by the activities performed at the site, with filling out a form being the highest level of engagement, scrolling up or down or paging up or down over a period of time such as a few minutes representing a medium level of engagement, and not scrolling or paging up or down or doing so quickly representing the lowest level of engagement. Other indications of engagement may be used.

In one embodiment, the registration process includes receiving an identifier of the user's account at a social network web site. In one embodiment, a similar other user may be any user associated with the user at the social network web site.

The user is the user corresponding to the user identifier received in step 310. It is noted that the user may not be identified to the level of an individual with any certainty because the user's browser or application may be shared with other users. The "user" is thus any user who provides the same user identifier to the server via a browser or other application.

Thus, in one embodiment, what is assigned to the retrieved page and terms are: Retrieved Page (intent); Each Term (term search score, number of times the term was seen by the user score, interest indication score, similar other user click score).

C. Identify Inventory Pages Corresponding to Terms, Assign Term Scores to Terms Corresponding to Each Inventory Page.

In one embodiment, a catalogue or an inventory of pages (sometimes referred to as "inventory pages") that may be linked from pages viewed by users may be maintained, with the contents of each page stored associated with the URL to reach that page. In one embodiment, a message or phrase or both may be maintained with some or all of the pages, to be used as some or all of the relevant information for the page. The message or phrase may be provided by a party from which the inventory page was received, or on that party's behalf. It is noted that in one embodiment, the available inventory of web pages is available for the server to analyze, for example, using a conventional cache or by a brute force method of storing every such page. The pages in the inventory may be updated from time to time, such as nightly, or at such time as indicated by the Expires header of the page.

Pages in inventory may be stored where they can be reached via the Internet. For example, inventory pages may include pages from the online encyclopedia, Wikipedia. The information stored for the inventory of such pages may include a copy of the page, or it may include the URL of the page at the Wikipedia Web site.

In one embodiment, the inventory of pages may include advertisements that are reachable from other sources, or those that only exist for the purpose of being linked to as described herein.

In one embodiment, each page in the inventory (the page or its URL) may be stored associated with one or more tags. The tags may be the titles of the web pages, anchor text from links in the web page, tags that were manually assigned by the author of the web page or a different party, or tags that were automatically assigned, for example by identifying words or phrases not part of the HTML commands (e.g. "<strike>" or anchor text of a link) and repeatedly used on a page, words or phrases used in the titles of web pages or both. Some or all of the tags correspond to the subject matter of the page, the theme of the page, or other information about the page. In one embodiment, tags are stored as entities of a page if the tag matches a tag in an index of potential tags. Each potential tag in the index has a list of potentially matching terms.

From the inventory, the pages associated with tags that correspond to terms on the web page identified in step 310 are identified, an identifier of the terms that correspond to that page are stored associated with that page, and term scores for each such page are assigned, one for each term that corresponds to the page 318.

In one embodiment, only those terms for which a weighted combination of term search score, number of times the term was seen by the user score, interest indication score, and similar other user click score, exceeds a threshold are used to locate pages, and the other terms below the threshold are ignored. The weights for each of these scores used to compute the weighted combination may be identified using conventional regression analysis techniques to maximize the number of times a user clicks at least one term on each retrieved page.

A tag may correspond to a term if it is the same as, or similar to, the term. In one embodiment, a tag is similar to a term if the tag has one or more words in common with the term, or one or more words in the tag are synonyms with one or more words in the term. A tag may correspond to a term if the term is on the index of potential tags as a term that corresponds to that tag.

A term score may be assigned for each term that corresponds to tags on the page as part of step 318. The term score for the page may be identified as a function of how closely any tag for the page matches the term on the page retrieved in step 310, with identical words in both the tags and the term having a higher initial score than those that are synonyms, and pages with higher percentage of the words in the tags for the page being the same or similar to the term having a higher initial term score than the term score corresponding to a term having words that match few or none of the tags on that page. If the index is used, the score for each potential term may be associated with each potential term for the tag and the score for a page having a tag that corresponds to a term may be identified by locating the score for the term that was used to match the tag from among the scores assigned to terms matching the tag that matched the term. If multiple tags matched a term, the highest one may be used or an average may be used.

In the descriptions of matching terms to tags and scoring them, it is noted that instead of matching terms to tags, tags may be matched to terms.

In one embodiment, a dictionary of words may be provided that lists the words that can be used for purpose of analysis as described herein, and only such words from a page being analyzed, the pages in the inventory or both, are used for any purpose described herein.

Thus, for each inventory page, for each term to which that inventory page corresponds, there is a term score assigned. Each combination of term and inventory page may have a different score, though some may end up with the same score.

D. Identify Scores for Pages.

1. Scores Relevant to the Context of the Term and Trustworthiness.

For some or all of each inventory page identified in step 318, scores corresponding to the quality of the page, and scores corresponding to how desirable the user will find the page or how desirable the user will find the page at the time, are identified as will now be described.

In one embodiment, a preference score is identified, a contextual relevance score is identified and a trustworthiness score is identified 320, for each page identified in step 318.

As noted below, the preference score may be identified either before or after step 322 and if the preference score is identified before step 322, in one embodiment, it is identified as part of step 320. In one embodiment, each preference the user may select is associated with a list of a certain number (e.g. 100 or 1000) of words or sets of words that web pages appealing to a person with that preference might contain. The preference score for the page is a function of the number of such words for any preference the user selected being on, or in the metadata of, the page, and the location of the word relative to the page (e.g. words in metadata or titles resulting in a higher score than the same word as regular text in the body of the page). For example, a list of sporting teams, names of players, coaches and owners, venues, sports and equipment may be associated with a "sports" preference, causing pages that have one or more of these words to have a higher preference score than pages that do not have any of these words. The type (as described above) of the web site containing the page may be used instead of, or in addition to, words on the page, with each preference being associated with one or more types. If the user indicates the degree of each preference, the score may be a function of the degree corresponding to the words matching on the page.

As noted above, step 320 includes identifying a contextual relevance score for each term corresponding to the selected page. The contextual relevance score is higher if the term as used in the selected inventory page corresponds to the meaning of the term as indicated by the context of the term relative to other words nearby the term on the page retrieved in step 310 than it does if the term as used in the selected inventory page does not correspond to the meaning of the term as indicated by the context of the term relative to other words nearby the term on the page retrieved in step 310, i.e. the one corresponding to the URL uploaded. For example, the term "nutty" may have a different meaning in the context of the actor Jerry Lewis than it would in the context of a peanut butter taste test. The contextual relevance score may be identified from the number of words nearby the term on the inventory page being analyzed that have the same or similar words in the selected page. A synonym table may be used to identify similar words. For example, if the term nutty came from the page being analyzed in the sentence, "Brand X peanut butter has a nutty flavor", if the selected inventory page uses the term "peanut butter" several times throughout the page, the selected inventory page will have a higher contextual relevance score than if the term 'nutty' came from the sentence "Jerry Lewis starred in the Nutty Professor" because the selected web page may use the words "Peanut Butter" more than it uses "Jerry Lewis" or "Professor". Other conventional methods of word sense disambiguation may be used.

The contextual relevance score for a term may be multiplied by a weight and the product added to the term score for that term for the selected page. The weight may be determined via conventional regression analysis to optimize for one or more conditions, such as to attempt to increase the clickback scores for the page when linked from the term corresponding to the score.

In one embodiment, a trustworthiness score is identified as part of step 320. The trustworthiness score is a function of how trust worthy the source of the page is. In one embodiment, trustworthiness may be measured by the second level domain name (i.e. the domain of the web site containing the inventory page being scored), the number of links to pages in that domain and the quality of those links. A link has a higher quality if it comes from a domain on a list of trusted domains, or if it comes from indirectly, that is, from a site from which a link to a trusted domain exists, via one or more other sites, with the quality being lower with increasing levels of indirection.

2. Select First Contextually Relevant, Trustworthy Page, Optionally Matching any User Preferences.

The first of the pages having a tag that corresponded to at least one of the terms and that has a combined preference score, trustworthiness score and optionally, contextual relevance score, that exceeds a threshold is selected 322. The other inventory pages that do not have such a threshold combined score are not considered for the retrieved page in one embodiment. The combined score may be produced by weighting each of the component scores by multiplying each of them by its own weight and summing the weighted scores. The weights may be identified using conventional regression analysis techniques to attempt to produce a combined score for each page that, when the combined score exceeds a threshold, the percentage of time the web page is clicked on by the user as described below is maximized and the number of times the user clicks back from the web page within a threshold amount of time of being clicked on is minimized.

Other ways of filtering pages to select may be used, for example by selecting pages that have a threshold contextual relevance score, optional preference score, or a threshold trustworthiness score, for example. In another embodiment, no threshold need be used and all pages having tags that correspond to terms are selected, one at a time.

3. Identify Score Based on Relevance of Each Page to the User's Preferences,

In the embodiment in which the preference score is identified after step 322, the preference score may be identified at step 324. In such embodiment, one or more scores are identified based on the relevance of the page to the user's preferences. One such score is a preference score and such score is identified 324 for the selected page.

In one embodiment, each preference the user may select is associated with a list of 1000 or more words or sets of words that web pages appealing to a person with that preference might contain. The preference score for the selected page is a function of the number of such words for any preference the user selected being on, or in the metadata of, the page, and the location of the word relative to the page (e.g. words in metadata or titles resulting in a higher score than the same word as regular text in the body of the page). For example, a list of sporting teams, names of players, coaches and owners, venues, sports and equipment may be associated with a "sports" preference, causing pages that have one or more of these words to have a higher preference score than pages that do not have any of these words. The type (as described above) of the web site containing the page may be used instead of, or in addition to, words on the page, with each preference being associated with one or more types. If the user indicates the degree of each preference, the score may be a function of the degree corresponding to the words matching on the page.

4. Score Based On Actions of the User.

One or more scores based on actions the user has previously taken with respect to the selected page is identified. One such score is a score corresponding to the average amount of time between the time the user previously clicked a link to the selected page, thereby causing the user to view the page corresponding to the link corresponding to the term, and then clicked back to the page on which the term was indicated as being a portal or link to additional information, and such a score is identified 326. This same user click back score is lower if the average time difference between such events is low and higher if the average time difference is high. In one embodiment, if a user clicks back after a threshold amount of time, the threshold amount of time (e.g. 5 seconds) may be used when calculating the average in one embodiment. In one embodiment, if the user does not click back, the average will not be affected and in another embodiment, when a user does not click back, the user is considered to have clicked back after a long amount of time, such as an hour. Other amounts may be assigned if the user does not click back, as little as five seconds.

5. Scores Based on Similarity of Experiences of the User.

One or more scores is identified based on similarity of experiences of the user and how recent those experiences are.

One such score is a score corresponding to how similar the selected page is to pages the user recently visited, and such score is identified 328. In one embodiment, the measure of how similar one page is to another is made via a comparison of the same or similar words on the two pages, though other metrics of similarity may be used. The score is higher if the selected page has many words in common with the user's recently visited pages and lower if it does not. Words that match or are synonyms may be identified as being in common (e.g. using a conventional thesaurus), with synonyms contributing less to the score than matches. Words in common that are contained in titles or metadata (e.g. page title or description) may be given a higher weight in scoring than words in body text in common. In one embodiment, if the exact same selected page was very recently visited, however, the score may be at or near zero or negative. In such embodiment, a page that is similar to pages the user visits are considered good candidates to which to link, but the same page the user visited very recently are not considered good candidates to which the link.

In one embodiment, the contribution to the score from each page the user visited is higher if the user had a higher level of engagement on such page (e.g. the user typing on the page or using a form element or filling in a web form is higher than scrolling up or down, which is higher than moving the mouse, which is higher than not taking any action on the page) than if the user had a lower level of engagement with such page, and the more similar pages the higher the score.

In one embodiment, the database described above that categorizes web sites according to a user's interests may be used to identify similar web pages, for example identifying web sites as financial web sites, and other web sites as news web sites. The score may be higher if the categories of the one or more web sites corresponding to pages in the user's history are the same as the selected page than it is if the categories of the one or more web sites corresponding to pages in the user's history are the not the same as the selected page, with the score being a function of the number of such web sites containing web pages in the user's history that have the same category as the selected page. Pages that are more recent in the user's history may have a greater effect on the score than pages less recent in the user's history. The user's history includes URLs uploaded as the user's history as part of step 216 as well as the individual URLs uploaded for analysis as part of step 220, each of FIG. 2 described above.

In one embodiment, pages that are viewed for less than a threshold amount of time before the user clicks back from them are not considered to be pages viewed by the user when identifying the score described above.

Another such score is a score corresponding to how relevant the selected page is, relative to recent searches of the user, and such score is identified as part of step 328. The score may be higher if the selected page has many of the search terms of any recent search and lower if it has fewer or no terms of any recent search. The contribution of a page to the score may be higher if the recent search terms are in header fields or title fields or other metadata fields of that page than if the search terms are in non header body text of the page. Terms from recent searches may be weighted higher in the score than older searches.

6. Scores Based on Qualities of Each Page.

One or more scores based on other qualities of the selected page are identified 330. One such score is an information type score.

In one embodiment, the information type score has different values for pages representing different information types. To identify the information type score, the type of the information is retrieved and the score is assigned a value corresponding to the type of information represented by the page.

An information type score may be used to provide a preference among certain information types for each page. For example, an advertisement or product page that might not have a large total score as described below may have its total score increased via its information type score. Information types may be segregated into those that produce revenue for the party performing at least a part of the system and method of the present invention and those that do not, and may be assigned by the entity that operates the server. Other types of information may be assigned than just the two types described above. If an information type for a page is not assigned or unknown, it may be assumed to be a default value, such as "non revenue producing".

The values for the information type score assigned to the types of web pages may be adjusted hourly to keep the number of revenue producing pages (or a different set of one or more information types) to which links are built as described herein within an upper and lower bound percentage of all pages to which links are built as described herein. Other types of pages may be constrained in the same manner based on their type or source. For example, pages from the web site wikipedia.com may be constrained to make up a percentage of web pages not higher than a certain percentage of the web pages to which links are made as described herein by assigning all such pages their own information type. Each hour, the number of links built to each type of page or source may be checked and the information type score adjusted in order to cause the percentage to more closely approximate the center of the range defined by the upper and lower bounds for that type or those types. In this case, a list of web sites or URLs and their types may be used by assuming all pages correspond to the type of the site hosting the page unless a different type is assigned to the URL of the page, with URLs or web sites not on the list assumed to have a default type.

In one embodiment, subtypes may be assigned within types and each inventory page is assigned to a type and subtype that represents the content of the page. Categories may be "movies", "people", "places", and "other", for example, though still other types may be used. Different values described above may be assigned based not only on the type, but also the subtype to which the page was assigned.

7. Score Based on Prior Actions of Other Users.

One or more scores is identified based on prior actions of other users. One such score is a similar other user click back score and such score is identified 332. The similar other user click back score is higher if other similar users (as described above) did not rapidly click back from the selected page when they click on a link to that page when it is linked from the same term and lower if such users rapidly click back, each on a percentage basis. In one embodiment, if the other similar user does not click back, the average will not be affected and in another embodiment, when another similar user does not click back, the other similar user is considered to have clicked back after a long amount of time, such as an hour. Other default periods, such as five minutes or five seconds, may be assigned.

Another score is a similar other user level of engagement score for the inventory page. The similar other user level of engagement score is higher if the other user had a higher level of engagement on such page (in the same manner as described above) than if the user had a lower level of engagement with such page, and the more such other users, the higher the score.

The scores described above utilize the information uploaded not only by the user's client computer system, but also that uploaded by other user's client computer systems. When the server receives such information, it is stored with the date and time of receipt and the user identifier. For example, click back times can be identified by analyzing the time page A was loaded, then page B that corresponded to a link provided, and then page A was reloaded: the click back time is the time difference between the second time page A was loaded and the time page B was loaded.

In one embodiment, the two types of click back scores described above may be affected by other actions such as scrolls up or down, page up or down, etc. that the user performed after clicking to the page corresponding to a link provided by the server.

Thus, in one embodiment, the scores assigned to each inventory page are a preference score, a contextual relevance score, a trustworthiness score, one or more scores based on actions the user has previously taken with respect to the selected page, one or more scores identified based on similarity of experiences of the user and how recent those experiences are, one or more scores based on other qualities of the selected page, one or more scores identified based on prior actions of other users.

8. Assign Page Score, Store all Scores, Select Next Page.

The scores described above in steps 324-332 are multiplied by weights for each of those scores and the results summed and assigned to the page as the page score. The weights may be set and adjusted to minimize click backs within a threshold amount of time, maximize revenue, or both of these, initially using conventional regression analysis or other similar techniques, and then adjusting the weights to attempt to optimize click back times, revenue or both.

In another embodiment, step 324 is performed before step 322 and the one or more scores identified in step 324 are used to select the pages in step 322 weighting and combining such score or scores in the same manner described above. In such embodiment, the one or more scores described in steps 324 may or may not be used as described above in the preceding paragraph. However, in another embodiment, any or all of the scores in steps 324 as well as step 320 (e.g. the trustworthiness score) may also be weighted and used with the other scores in the immediately preceding paragraph. Other forms of modeling may be used to produce the various scores described herein, including linear or non linear models, supervised learning models or unsupervised learning models or other types of models.

The URL for the page and corresponding terms for which the page was selected and, for each such term, the term score, are stored 340, and if there are more pages 342, the next page that corresponded to at least one of the terms for which the weighted combination of term search score, number of times the term was seen by the user score, interest indication score, and similar other user click score, exceeds the threshold as described above; and that has a combined preference score and trustworthiness score optionally combined with the contextual relevance score, that exceeds a threshold is selected 344 in the same manner as described above, and the method continues at step 318 using the newly selected page.

E. Score Pages for Each Term.

There may be a many-to-many relationship between terms being analyzed as described herein and pages to which such terms may be linked. Thus, an inventory page may correspond to more than one term on the page being analyzed, and a term may have more than one inventory page to which it corresponds. In one embodiment, to identify the terms that will be indicated as being portals or links to additional information, as well as which inventory page (or pages) will be linked to that term, a total term score is computed for each term corresponding to each inventory page that was selected as described above.

In one embodiment, each inventory page selected in steps 322 or 342 is assigned a total term score for each term score that page has. The total term score for a term and inventory page is a weighted combination of the term score for the term and inventory page assigned as described in step 318, all of the scores computed as described above in for that term, described in steps 312-316, and all of the scores for that page, computed as described above in steps 320 and 324-332. The weights may be identified using conventional regression analysis techniques to minimize clickbacks that are under a threshold, maximize revenue, maximize other goals or maximize a function of multiple goals.

To review, a total term score is assigned to each term to which an inventory page corresponds. Thus, an inventory page that corresponds to three terms, will have three total term scores. If a different inventory page also corresponds to one of those three terms, that page will have a total term score that corresponds to that term and page, and the total term score for the same term may have a different value for each page. The total term score is a function of how applicable the term is believed to be to the user and how applicable a page is believed to be to the user and the term. Other ways of deriving a similar score for each combination of term and page may be used.

F. Select Pages with Highest Scores Subject to Other Constraints.

If there are no more pages 342, the page with the highest total term score is selected (with ties broken by selecting the page with the term corresponding to its highest score that is furthest from the other terms marked for the page as described below) and the total term score is compared to a threshold 346. If the total term score is above the threshold 348, in the case of the first selected page the page is assigned to an instance of the term corresponding to that total term score on the page 352. As a result of the assignments made herein, the page will be linked from the term indicated as being a portal or link to additional information so that the user can click on the term indicated as being a portal or link to additional information and view the page. In the case of the first page assigned, the instance of the term may be selected at random. The page is marked as used and the term is marked as completed as part of step 352.

The page that has the highest total term score is selected from among the pages not marked as used for terms that are not marked as used and the position of the instances of the terms on the page is checked against the other instances marked as used for other pages to ensure that an instance of the term corresponding to the highest total term score selected is not near one of the other instances of a different term to which a page has been assigned 354. In one embodiment, if no such instance of the term is available, if the same page has a one or more different terms with the same term score, any of those terms may be used to identify an acceptably located term instance may be identified to which the page may be assigned that is not too close to the other term instances marked, and if this is not possible, for the pages already assigned to terms as described herein, an attempt may be made to reassign such pages to different instances of the those terms (or to other terms with the same term score for each such page) in an attempt to spread out the instances of terms to which pages are assigned so that they are not too close together on the page retrieved in step 310 as part of step 354. In one embodiment, terms nearer to the other terms by less than 5 percent of the number of words on a page are considered to be too close together.

In one embodiment, the location of the words on the page is used to spread around the page the terms indicated as being a portal or link to additional information. Thus, a term that is directly over another term that has been assigned to be indicated as being a portal or link to additional information on the page will be considered too close to the other term, even though there may be many words between them. In such embodiment, a distance vector to the nearest other term on the page may be identified and a minimum distance enforced. The minimum may be a function of the various scores described herein, allowing a term with a higher score to be indicated as being a portal or link to additional information closer to another term indicated as being a portal or link to additional information than it would be allowed to be if one or more scores were lower.

In the event that previously assigned terms are changed, marks and assignments are adjusted as needed to correspond to those terms and pages used.

Additionally as part of step 354, the number of marked terms is compared to a maximum number of allowable marked terms on a page (e.g. 5) and other thresholds may be compared, for example, a maximum number of page of a given type assigned to the page (e.g. no more than two revenue producing pages assigned to any page). In one embodiment, the maximum number of pages of a given type may be identified as a function of the intent identified as described above. For example, the maximum number of revenue producing pages (e.g. advertisements) may be higher if the intent is "purchase" than if the intent is something other than "purchase".

If the number of marked terms is equal to the maximum 356, the method continues at step 358. Otherwise 356, if the total term score is not above the threshold 348, the method continues at step 358.

If the total term score is above the threshold 348, if other thresholds are not exceeded and an acceptably positioned instance of a term was found for the page corresponding to the identified score 350, the method continues at step 352 and otherwise 350, the page is marked 360 and the method continues at step 354.

In one embodiment, instead of scoring all of the inventory pages, the pages are scored as described above in descending order of contextual relevance and those with the highest total term score above a total term score threshold are marked until the maximum number of different inventory pages have been so marked.

G. Update Databases of Terms Seen and Number of Times Indicated as being a Portal or Link to Additional Information; Provide Term Instance Information and Related Information to Client.

At step 358 a database of terms each user has seen, the number of times that user has seen the term and the current date it was seen is updated for each term identified for the page retrieved in step 310, and a database of terms indicated as being a portal or link to additional information each user has seen, the number of times that user has seen the term indicated as being a portal or link to additional information and the current date it was seen, is updated for each term marked as described above. To update the database, the term, date and user identifier are added to the database.

For each term, the term, the instance of the term to be indicated as a portal or link to additional information and URLs of inventory pages assigned to the instance of the term as described above are provided to the client as part of step 358 and the method continues at step 310. As noted, the terms and instances may be provided initially and the URL or URLs for each term may be provided by the server to the client upon request from the client when the client receives an interest indication for the term. Each term and instance and the URL may be stored by the server associated with the user identifier to allow it to be provided upon request at the later time, by the client sending to the server the user identifier and term.

In one embodiment, instead of, or in addition to indicating terms in a page as portals or links to additional information, a button or other user interface element may be displayed to the user (e.g. on the user's browser) that, when clicked, allows the user to receive an inventory page relevant to the page they are viewing. The user interface element may be displayed differently (e.g. using different colors) based on how relevant the inventory page is to the user or to the page the user is viewing or to the user in general. The inventory page that is displayed if the button is clicked may be one of the inventory pages described above (e.g. the one with the highest overall total term score) or it may be a different score computed for this purpose. For example, the inventory page displayed when the button is clicked may be the inventory page that has the highest sum of all total term scores computed for the page that exceed a threshold, i.e. summed across each term on the page. Thus, an inventory page that has a total term score that exceeds the threshold for many, many terms on the page may be selected for display over an inventory page that has at least one higher total term score, but corresponds to fewer terms on the page retrieved. The total term scores used for the selection of the inventory page displayed or otherwise provided to the user when the user clicks the button may be weighted differently than the total term score used as described above, in essence, employing two total term scores for each one described above, one used for the purpose of indication as a portal or link as described above, and another used for the purpose of selecting the inventory page to be used to provide to the user when the user clicks the button.

The delivery to the user of inventory pages may be made using links as described herein, but also may be made via other sources, such as a specific user interface element that is integrated into a browser or made as a part of a separate application, or via e-mail or a mobile phone or tablet application that is linked to the user identifier using conventional techniques (e.g. the user could provide an e-mail address or mobile phone number or other identifier as part of the registration process described above, or the user could receive their user identifier as part of the registration process or at a later time and enter it to a mobile phone application that would register it to a server, which would make the link between the two applications. In the case of inventory pages provided to the user, the inventory pages may be content other than web pages (e.g. they may be embedded into an e-mail or content that will be displayed by an application).

The inventory page that would be provided to the user if the user clicked the button may be the inventory page provided to the user, and in one embodiment, such pages are pushed to the user without the user clicking on any button. Just by visiting a web page, such inventory page or pages may be provided to a user.

Multiple such inventory pages may be combined and provided to the user at the same time. Instead of choosing one inventory page to provide to the user, those with the highest N scores described above may be provided to the user.

Inventory pages may be provided to a user after the user visits several pages. Thus, the scores for inventory pages may be cumulated across multiple retrieved web pages and used to select the one or more inventory page to be provided to the user.

System.

Figure 4:
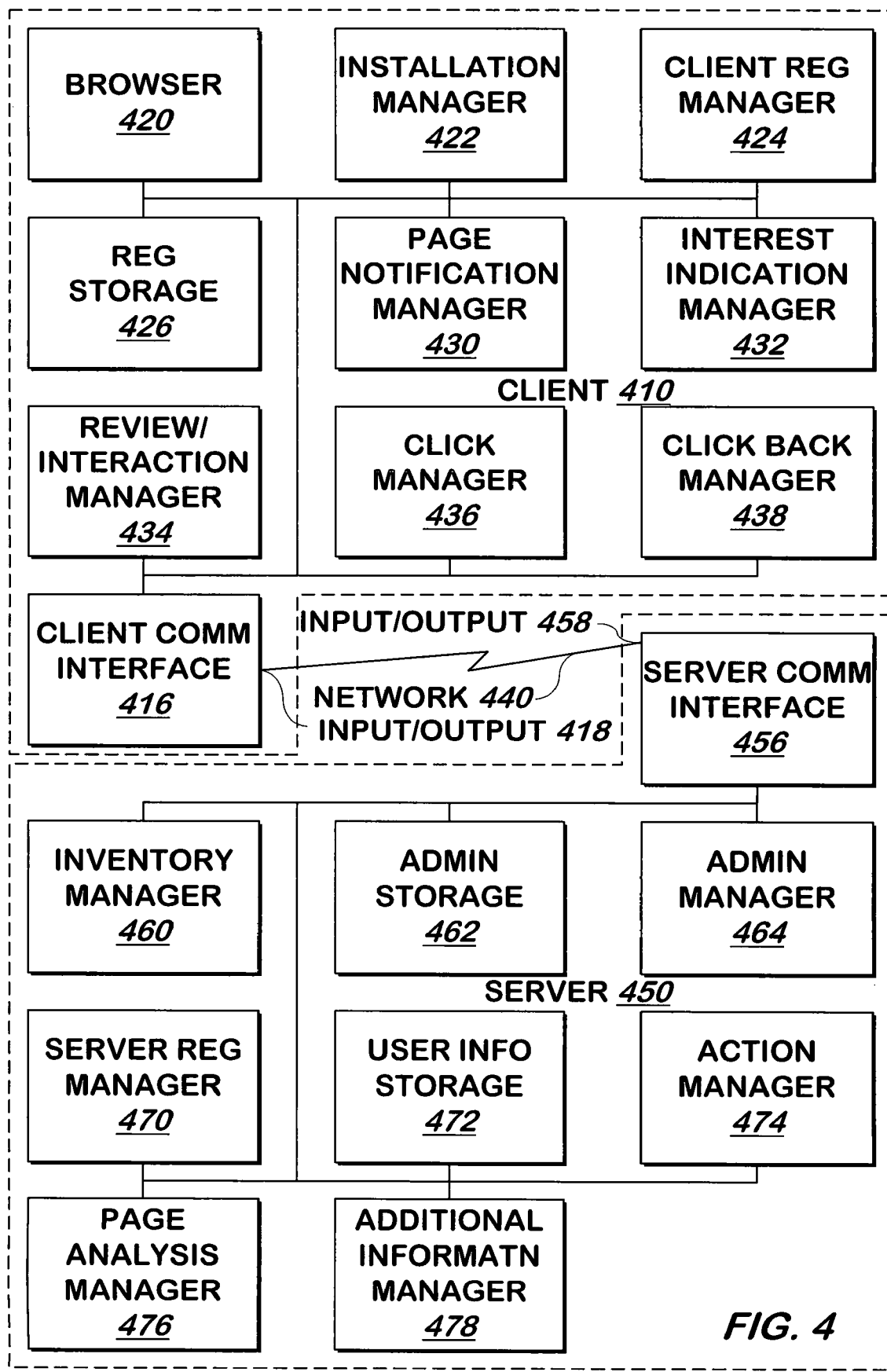
FIG. 4 is a block schematic diagram of a system for adding information to a web page viewed by a user according to one embodiment of the present invention.

Referring now to FIG. 4, a system for adding information, such as links to related information, to web pages is shown according to one embodiment of the present invention. The system shown in FIG. 4 includes a client computer system 410 coupled to a server computer system 450 via a conventional network 440 such as the Internet, an Ethernet network or both. In one embodiment, the server computer system 450 is coupled to multiple client computer systems 410 though other numbers of each may be used. Each of client computer system 410 and server computer system 450 has a communication interface 416, 456, each of which includes a conventional TCP/IP-compatible communication interface running suitable communication protocols. All communication to and from client computer system 410 is provided via client communication interface (which is additionally coupled to a conventional keyboard/mouse/monitor not shown) 416 and all communication to and from server is provided via server communication interface 456.

Browser 420 is a conventional browser, such as those described above. In one embodiment, the user may use browser 420 to view web pages and to download installation manager 422 which downloads and installs elements 424, and 430-438 as an add on, extension, separate application, etc. as described above.

Installation manager 422 signals client registration manager 424, which requests and receives from server registration manager 470 a unique client identifier for the installation. Client registration manager 424 stores the unique client identifier into registration storage 426 and provides a user interface to the user to allow the user to provide demographic and/or interest and preference information about himself as described above, and client registration manager 424 provides such information to server registration manager 470 with the unique client identifier. Server registration manager 470 stores the information it receives into user information storage 472 associated with the client identifier it receives. In one embodiment, instead of receiving and forwarding such information, client registration manager 424 directs browser 420 to a web page provided by server registration manager 470 and includes URL parameter passing information (to the right of a slash that is itself to the right of the address of the web page in the URL) which includes the client identifier. Server registration manager 470 may prompt the user for and receive such information directly from the user, and store it as described above. In one embodiment, server registration manager 470 adds a cookie with an encrypted version of the client identifier to allow the client identifier to be obtained for use as described herein.

In one embodiment, installation manager 422 performs any functions necessary to receive notifications of the user's actions such as viewing a new web page, scrolling on a web page, hovering, clicking or typing in a browser window, and/or typing in, operating, or otherwise interacting with a web form. Such functions may be inherent in the installation process or they may be explicitly performed, such as by registering to receive such notifications from browser 420. As described herein, the system works to add functionality to a browser in one embodiment, but the other arrangements described above may be used in other embodiments, and so actions described herein may be performed with respect to information other than web pages.

Page notification manager 430 receives from browser 420 a notification that the user has clicked on a new page (or has switched tabs onto an existing page or changed the focus back to the browser from another application or the operating system) and receives from browser 420 the URL of the page. Page notification manager 430 provides the URL of the page and the client identifier stored in registration storage 426 to page analysis manager 476 of server 450.

When it receives the URL, page analysis manager 476, which is described in more detail with respect to FIG. 5, below, analyzes the page as described herein, and returns to page notification manager 430 the instances of the terms that should be indicated as being a portal or link to additional information as described herein. Page analysis manager 476 stores the date and time of receipt of the URL, the URL, the terms and the additional information into user information storage 472 associated with the client identifier it received.

User information storage 472, registration storage 426, and admin storage 462 may include conventional memory or disk storage and may include a conventional database.

When it receives the terms and instance information, 20 page notification manager 430 instruments the web page to so indicate such instances of such terms as described above and to receive an indication of the term if the user hovers over a term on the page for more than a threshold amount of time as described above.

If the user hovers over one of the indicated terms, browser 410 will indicate the term and the URL of the web page to interest indication manager 432. In response, interest indication manager 432 will send the URL and a reference of the term over which the user hovered and the client identifier stored in registration storage 426 to additional information manager 478, which stores into user information storage 472 the term over which the user hovered, the client identifier and the date and time of receipt (obtained from an operating system, not shown) and uses the client identifier, URL and an identifier of the term to locate the additional information for that term using the most recent set of information for the URL and client identifier received and provides the additional information to interest indication manager 432. Interest indication manager 432 displays the additional information as described above as part of, or separately from, the information being displayed by the browser, and the browser may retrieve pages corresponding to any links the user presses. The area around the link may be instrumented by interest indication manager 432 to cause browser 420 to indicate that the user has clicked the link to click manager 436. If the user clicks the link, click manager 436 sends the term, URL of the link clicked and the client identifier in registration storage 426 to action manager 474, which adds the date and time of receipt and stores all such information into user information storage 472.

In the event the user clicks back from a page, browser 420 will so indicate to click back manager 438. Such operation may be arranged as part of the installation process arranged by installation manager 422. If such an indication is received, click back manager 438 provides the client identifier from registration storage 426 and an indication that the user has clicked back to action manager 474 which stores into user information storage 472 the indication and client identifier and the date and time of receipt it retrieves from an operating system (not shown). In one embodiment, browser 420 provides click back manager 438 the URL of the page from which the user clicked back and click back manager 438 provides the URL to action manager 474, which stores it with the other information described above.

In the event that the user scrolls up or down, moves the mouse around, interacts with, or types into, the page or a form on the page or performs another action that indicates the user is reviewing or interacting with the page or a form on the page as described herein, browser 420 informs review/interaction manager 434 of the action performed. Such operation may be arranged by installation manager 422 as part of the installation.

Review/interaction manager 434 provides the client identifier from registration storage 426 and the indication of the action to action manager 474, which stores into user information storage 472 the client identifier, an indication of the action or type of action (e.g. the user appears to be reviewing the page due to a scroll, page up or down or moving the mouse, in which case the type is a "review", or the user appears to be actively engaged with the page by typing or interacting with a form element on the page, in which case the type is "engage") and the date and time of receipt retrieved from an operating system (not shown). In one embodiment, review/interaction manager 434 only sends indications once every few seconds. If two of the same indications or same type of indications are received in rapid succession and then none are received, review/interaction manager 434 may only send one of them, in order to indicate to action manager 474 that the user was engaged with the page, without sending every indication.

Figure 5:
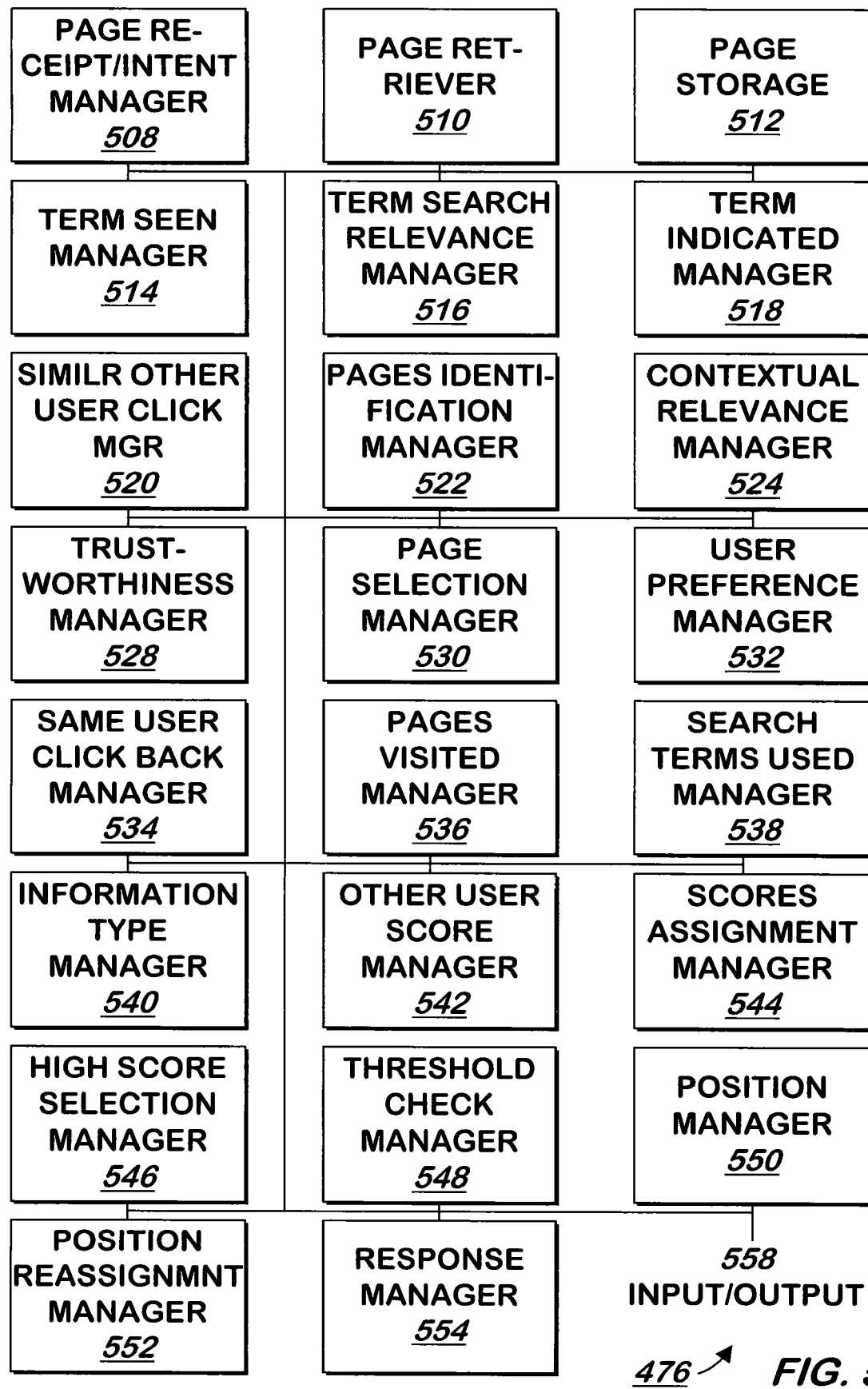
FIG. 5 is a block schematic diagram illustrating the 15 page analysis manager of FIG. 4 in more detail according to one embodiment of the present invention.

Referring now to FIGS. 4 and 5, page analysis manager 476 of FIG. 4 is shown in FIG. 5 in more detail according to one embodiment of the present invention. Page receipt/intent manager 508 receives via input/output 558 the client identifier of the user and the URL of the page, and stores them and the date and time of receipt it retrieves from an operating system into a page object. Page receipt/intent manager 508 stores the information received and the date and time of receipt into user information storage 472 as described above.

Page receipt/intent manager 508 identifies the intent of the user as described above and stores the intent into the page object. In one embodiment, page receipt/intent manager 508 identifies the intent based on the second level domain in the URL received and a database of second level domains and their corresponding intents that an administrator has stored into administration storage 462 using a user interface provided by administration manager 464. When page receipt/intent manager has finished identifying the intent, page receipt/intent manager 508 provides the page object to page retriever 510.

When it receives the page object, page retriever 510 retrieves from the Internet or a cache the Web page specified by the URL of the page object and stores the contents of the page into page storage 512 and adds the URL, date and time of retrieval, and the expiration date and time from the expires header to an index of pages stored in page storage 512. In one embodiment, page retriever 510 first checks the index and expiration date and time to determine if the page is expired by comparing the expiration date and time with the current date and time it retrieves from an operating system, and only retrieves the page if it is not in the cache and not expired. Page retriever 510 associates in user information storage 472 the page in page storage 512 with the client identifier in the page object. Page retriever 510 adds a pointer to the page in page storage 512 to the page object and provides the page object to term seen manager 514. When it receives the page object, term seen manager 514 identifies the terms on the page as described above and stores the terms into user information storage 472, associated with the date and time and client identifier from the page object. Terms seen manager 514 stores the terms into the page object. In one embodiment, multiple instances of the same term are treated as separate terms and are stored separately in the page object. In this embodiment, an indication of where the term was located on the page is stored associated with the term in the page object by terms seen manager.

For each term, identifies the score corresponding to the number of times a user corresponding to that client 5 identifier has seen that term as described above, and stores the number of times the term was seen by the user score, for each term into the page object associated with the term to which the score corresponds. To compute such score, for each term in the page object, terms seen manager 514 identifies in user information storage 472 the number of times the user has seen the term and optionally the date and time the user saw the term and computes a term score as described above.

Terms seen manager 514 provides the page object to 15 term search relevance manager 516.

When it receives the page object, term search relevance manager 516 computes the term search relevance score for each term in the page object using the search terms received from and stored for that user in user information storage 472 as described herein, stores the term search relevance score for each term into the page object associated with that term, and provides the page object to term indicated manager 518.

When it receives the page object, for each term therein, term indicated manager 518 identifies, for each term in the page object, the score corresponding to the number of times the term was indicated as being a portal or 5 link to additional information as described above, using the information in user information storage 472 about terms indicated to the user corresponding to the client identifier in the page object, and stores into the page object each such score associated with its corresponding 10 term. Term indicated manager 518 provides the page object to similar other user click manager 520.

When it receives the page object, similar other user click manager 520 uses the information about the user and other users stored in user information storage 472 as described herein to identify similar other users as described above and identifies, for each term in the page object, the score corresponding to similar other users clicking links from that term as described above and stores the score for each term in the page object associated with that term. Similar other user click manager 520 provides the page object to page identification manager 522.

When it receives the page object, pages identification manager 522 identifies, as described above, the inventory pages corresponding to the terms in the page object, and stores, for each such inventory page, an identifier of the pages, such as the URLs of such pages, associated with each term to which such inventory page corresponds.

In one embodiment, inventory pages are periodically retrieved into page storage 512 by page retriever 510 using a list of URLs of pages to periodically retrieve that a system administrator may administer using a user interface provided by page retriever 510, which receives them. Page retriever 510 stores the list into page storage 512 and uses the list to retrieve the pages. In one embodiment, a second level domain name may be provided for each of several domains, in which case page retriever 510 spiders the domain and retrieves all pages it can locate. In one embodiment, page retriever 510 tags pages it retrieves from the list as described above and stores the tags associated with the URL. A human may check the tags or manually add or change a tag in page storage 512 using a system administration computer system (not shown) coupled to the Internet and a user interface provided by page retriever 510.

Pages identification manager 522 identifies the term score for each such page as described above and stores the term score into the page object, associated with the term and page identifier. Thus, the term score in the page object identifies, for each term corresponding to an inventory page, how well the inventory page corresponds to the term.

In one embodiment, if the term appears more than once on the page, a term score is assigned to each instance of the term, for example in the order in which the term appears in the terms stored in the page object.

When it has completed identifying inventory pages and assigning term scores, pages identification manager 522 provides the page object to contextual relevance manager 524.

When it receives the page object, contextual relevance manager 524 identifies, as described above, the contextual relevance score for each inventory page using the term to which the inventory page corresponds, the page being analyzed stored in page storage 512, and the inventory page stored in page storage 512, and then weights and combines as described above the contextual relevance score into each term score in the page object corresponding to the term for each inventory page for which the contextual relevance score corresponds. Contextual relevance manager 524 provides the page object to user preference manager 532 in the embodiment in which the preference score is used to select pages as described above, or to trustworthiness manager 528 otherwise.

When it receives the page object, user preference manager 530 identifies and stores in the page object for each inventory page identified in the page object, a preference score as described above, using the preference information stored in user information storage 472 corresponding to the client identifier in the page object, the text of the inventory page stored in page storage 512 and other information such as a list of words that a system administrator may store into administration storage 462 via a user interface provided by administration manager 464. Administration storage 462, user information storage 472 and page storage 512 may include conventional memory or disk storage and may include a conventional database. When it has completed storing the preference scores preference manager 530 provides the page object to trustworthiness manager 528 in the embodiment in which the preference score is used to select pages by page selection manager 530 and to same user click back manager 532 otherwise.

When it receives the page object, trustworthiness manager 528 computes, as described above, the trustworthiness score for each inventory page specified by the page object and stores the trustworthiness score associated with the inventory page into the object. Lists of initial trustworthy web sites may be stored by a system administrator into administration storage 462 via a user interface provided by administration manager 464, and trustworthiness manager 528 may periodically spider the web from such sites using conventional techniques to identify the trustworthiness score of a page by decreasing the trustworthiness score for a site the larger number of hops across different links it takes to reach the site from the initial trustworthy sites, and increasing the trustworthiness score of a page the more links there are to the site or to the page. Trustworthiness manager 528 may store such trustworthiness scores into administration storage 462, along with the date and time, and the most recent trustworthiness score is used. The trustworthiness score of sites on the initial trustworthy sites list may be higher than other sites, and pages from those sites have the highest trustworthiness scores. When it has completed identifying the trustworthiness of each such inventory page, trustworthiness manager 528 provides the page object to page selection manager 530.

When it receives the page object, page selection manager 530 selects the inventory pages selected as described above using any or all of the contextual relevance score, trustworthiness score and preference score, and the scores assigned to the terms as described herein and indicates the selected inventory pages in the page object. As opposed to the one at a time processing of the selected pages described above, as described herein, the selected pages may be processed in a batch of all inventory pages by the various elements described below, and each technique (one at a time processing or batch processing) may be used in the method, system or computer program product.

In the embodiment in which the preference score is not used to select the inventory pages by page selection manager 530, page selection manager provides the page object to user preference manager 532, which identifies a preference score for each of the selected inventory pages, stores the preference score for each inventory page in the page object associated with the identifier of the inventory page (e.g. the URL) and provides the page object to same user click back manager 534. The preference score may be identified from the preferences of the user corresponding to the client identifier in the page object, such preferences being stored in user information storage 472, the list of words stored in administration storage 462 via a user interface provided by administration manager 464, and the contents of the inventory pages stored in page storage 512. In the embodiment in which page selection manager 528 uses the preference score to select the inventory pages, page selection manager 530 provides the page object to same user click back manager 534.

When it receives the page object, same user click back manager 534 computes as described above the same user click back score for each of the selected pages, stores the same user click back score for each such page into the page object associated with the identifier of the inventory page to which it corresponds and provides the page object to pages visited manager 536. Click backs for the user may be identified by the user clicking on a web page via a link inserted as described herein, and then clicking back within a threshold amount of time, as recorded in user information storage 472 for the user having the client identifier in the page object.

When it receives the page object, pages visited manager 536 computes, as described above, the score corresponding to how similar the selected page is to pages the user recently visited for each selected page (as described above), stores such score (the "similar to pages visited score") into the page object associated with the identifier of the inventory page to which such score corresponds and provides the page object to search terms used manager 538. To identify the score, the text from pages the user visited stored in page storage 512 and associated in client information storage 472 with the client identifier in the page object, or those visited without clicking back for at least a threshold amount of time, are used as described above. The actions the user performed while on the page (e.g. those that indicate the level of engagement) may be used as described above. The text from the pages may be stored in page storage 512, and a reference to the page and client identifier, along with the date and time may be stored by page retriever 512 into user information storage 472 when it retrieves the page as described above. When it receives the page object, search terms used manager 538 identifies the score indicating how relevant each selected page is, relative to recent searches of the user as described above. In one embodiment, when a URL for a web page from conventional search engines is received with the search terms used, instead of retrieving and storing the page, page retriever 510 stores the search terms associated with the client identifier and the date and time into user information storage 472 and search terms used manager 538 uses such search terms as described above and the contents of each inventory page stored in page storage 512. Such score is stored by search terms used manager 538 and stored into the page object associated with the selected page to which such score corresponds, for each selected inventory page. Search terms used manager 538 provides the page object to information type manager 540. When it receives the page object, information type manager 540 identifies the score based on the information type of each selected inventory page in the page object using a list of inventory page types for each URL or domain name that a system administrator stores into administration storage 462 using a user interface provided by administration manager 464, and the URL or domain name within the URL of each selected inventory page in the page object. Information type manager 540 stores each such information type score into the page object associated with the inventory page to which it corresponds and provides the page object to other user score manager 542.

When it receives the page object, other user score manager 542 identifies, for each selected inventory page specified by the page object, the similar other user click back score and similar other user level of engagement score for such page as described above and stores such scores into the page object associated with the inventory page to which each such score corresponds. To identify such scores, other user score manager 542 identifies similar other users using the preference information stored into user information storage 472 or using the URL of the web pages the user corresponding to the client identifier in the page object has viewed and the URL of the web pages such other users have viewed, stored in user information storage 472; preferences of such user and other users stored in user information storage 472 or both, and the actions such users performed on each page, or indications thereof, to identify the level of engagement as described above. For each selected inventory page in the page object, other user score manager 542 assigns a similar other user click back score based on whether the information in user information storage 472 indicates the user clicked on any such pages and either clicked back quickly or did not click back quickly, as described above. Other user score manager 542 stores in the page object the similar other user click back scores and the similar other user level of engagement score to each selected inventory page associated with the identifier of the selected inventory page to which the similar other user click back score corresponds. When it has completed identifying the similar other user click back scores and similar other user level of engagement scores, other user score manager 542 provides the page object to scores assignment manager 544.

When it receives the page object, scores assignment manager 544 computes as described above, for each selected inventory page specified by the page object, the total term score for each term corresponding to each such inventory page specified by the page object and stores into the page object the total term score for each term corresponding to each page, associated with the page identifier and the term. When scores assignment manager 544 has finished computing and storing the total term scores for each selected page and each term corresponding to that page, scores assignment manager 544 provides the page object to high score selection manager 546.

When it receives the page object, high score selection manager 546 identifies the highest total term scores corresponding to N terms that are different from another, and indicates in the page object the highest total term score for each of the N terms, by indicating in the page object, the inventory page and the instance of the term with such highest score. Thus, if N is 3, and two instances of the same term have the highest and second highest total term scores, only the instance of the term (and the inventory page to which it corresponds) with the higher of the two total term scores will be indicated from among those two term scores, so that the N terms indicated will not have any duplicate terms that are merely different instances. High score selection manager 546 marks the term on the page object for which each inventory page is being indicated, and provides the page object to threshold check manager 548, which checks to make sure the indicated total term scores meet the minimum threshold described above, and optionally that no more than a maximum number of types of inventory pages are indicated. Page types used by threshold check manager 548 may be stored by a system administrator associated with the page contents in page storage 512. If any total term score does not exceed the minimum threshold for a total term score, the indication for that total term score is removed by threshold check manager 548, and thus in that circumstance, the page will have fewer than N terms that will be displayed as portals or links to additional information. In the event that a5 page type has exceeded its threshold, threshold check manager 548 will mark in the page object as invalid, one or more indications with the lowest total term score corresponding to inventory pages that exceed the threshold number for their type as described above, and will return the page object to high score selection manager 546 along with the type of inventory pages whose thresholds were exceeded and the number of pages whose indications were removed. High score selection manager 546 will select that many total term scores corresponding to other pages from the next highest total term scores (e.g. the ones with scores immediately below the lowest one previously indicated) for terms that are different from one another and different from each other, and are not the same type received, indicate the inventory pages corresponding to the selected total term scores, and provide the page object to threshold check manager 548, which repeats the process of checking. Threshold check manager 548 will either return the page object to high score selection manager 546 with the other information described above if thresholds are exceeded or, if none of the thresholds are exceeded, will provide the page object to position manager 550.

In one embodiment, page notification manager 430 retrieves or receives from browser 420 the dimensions of the window in which the page having the URL it provides is displayed. Page notification manager 430 provides such dimensions with the other information it provides to page analysis manager 476. Page receipt/intent manager 508 adds such dimensions to the page object with the other information as described above.

When it receives the page object, position manager 550 checks the position of the terms indicated using the dimensions of the window in the page object (or default dimensions may be assumed) and the contents of the page in page storage 512 as described above. If the positions of the terms indicated are sufficiently dispersed on the page as described above, position manager 550 provides the page object to response manager 554 and otherwise position manager 550 marks the indicated terms that are too close to one another in the page object and provides the page object to position reassignment manager 552.

When position reassignment manager 552 receives the page object, position reassignment manager 552 reassigns the indicated terms so that they are not too close to one another as described above, removing indications in the page object from terms formerly indicated that it reassigns and adding indications in the page object for the terms it newly assigns as described above, and provides the page object to response manager 554.

When response manager 554 receives the page object, response manager 554 provides the indication of the instance of the N terms indicated at the input/output 558 to the client computer system 410 as described above. In one embodiment, a serial number unique to the client identifier is also provided with such response.

In one embodiment, the URL received, the client identifier, the unique serial number, and identifiers of the URLs for the pages assigned to the N indicated terms from the page object, as well as other information from the page object, are stored into user information storage 472 by response manager 554 for use as described herein, for example, to provide the additional information.

In one embodiment, the identifiers of the pages for each term are stored in user information storage 472 in the same order as the terms were provided. To obtain the additional information for a term, interest indication manager 432 provides the client identifier, the unique serial number, and an index of the term to allow additional information manager 478 to retrieve the identifier of the inventory page from user information storage 472. Additional information manager 478 may then use the identifier of the page to retrieve any additional information from page storage 512 that is not already stored in user information storage 472 and provides the additional information in response as described herein.

Thus, links from a web page that were not supplied by the author of the web page are enabled for use by a user from any web page a user views, and the web pages reached by such links are custom tailored to be those of most interest to the user, even though they are not linked by the author and not necessarily on the same web site as the web page the user is viewing. The enabling of such links is performed by an entity independent from the entity that operates the web page being viewed, and may be independent of the entities that operate each web site containing the pages to which the page being viewed will be linked.

What is claimed is:

1. A computer-implemented method for providing customized content, the computer-implemented method comprising:
   identifying one or more relevant terms on a webpage presented via a web interface, and wherein the web interface is configured for presentation to a user associated with a user profile;
   determining one or more user intents corresponding with the webpage;
   determining an interest indication score for each relevant term based at least in part on past user activity data of a similar user profile set associated with the user profile, wherein the similar user profile set is determined by comparing the user profile to a plurality of other user profiles to determine a similarity score for each of the plurality of other user profiles, and selecting the similar user profile set by comparing the similarity scores for each of the plurality of other user profiles to a user similarity threshold;
   determining a term search relevance score for each relevant term based at least in part on user actions associated with the user profile;
      determining a weighted combination score comprising the one or more term search relevance scores and the one or more interest indication scores; and
      if the weighted combination score exceeds a weighted combination score threshold,
         displaying, via the web interface, the customized content corresponding with the one or more relevant terms and the one or more user intents.

2. The computer-implemented method of claim 1, wherein the similarity score for each of the plurality of other user profiles is based at least in part on a number of shared webpage visitations associated with the user profile and the plurality of other user profiles.

3. The computer-implemented method of claim 1, wherein identifying the one or more relevant terms on the webpage further comprises receiving a user interest indication with respect to at least one of the relevant terms when a pointer interface element associated with the user profile is placed on a corresponding relevant term for a threshold time interval.

4. The computer-implemented method of claim 1, wherein displaying, via the web interface, the customized content further comprises:
   displaying a user interface element; and
   displaying one or more inventory pages in response to the user selecting a corresponding portion of the user interface element.

5. The computer-implemented method of claim 4, wherein displaying one or more inventory pages comprises displaying an inventory page with a maximum sum of the one or more term search relevance scores that exceeds a term search relevance score threshold.

6. The computer-implemented method of claim 1, further comprising:
   identifying additional information corresponding with the customized content;
   identifying, based on the user identifier, a separate application linked to the user profile; and
   transmitting, for display, the additional information to the separate application.

7. An apparatus comprising at least one processor and at least one non-transitory memory comprising program code, wherein the at least one non-transitory memory and the program code are configured to, with the at least one processor, cause the apparatus to:
   identify one or more relevant terms on a webpage presented via a web interface, and wherein the web interface is configured for presentation to a user associated with a user profile;
   determine one or more user intents corresponding with the webpage;
   determine an interest indication score for each relevant term based at least in part on past user activity data of a similar user profile set associated with the user profile by comparing the user profile to a plurality of other user profiles to determine a similarity score for each of the plurality of other user profiles, and selecting the similar user profile set by comparing the similarity scores for each of the plurality of other user profiles to a user similarity threshold;
   determine a term search relevance score for each relevant term based at least in part on user actions associated with the user profile;
   determine a weighted combination score comprising the one or more term search relevance scores and the one or more interest indication scores; and
   if the weighted combination score exceeds a weighted combination score threshold,
      display, via the web interface, the customized content corresponding with the one or more relevant terms and the one or more user intents.

8. The apparatus of claim 7, wherein the program code are further configured to cause the apparatus to: determine the similarity score for each of the plurality of other user profiles based at least in part on a number of shared webpage visitations associated with the user profile and the plurality of other user profiles.

9. The apparatus of claim 7, wherein the program code are further configured to cause the apparatus to identify the one or more relevant terms on the webpage by:
   receiving a user interest indication with respect to at least one of the relevant terms when a pointer interface element associated with the user profile is placed on a corresponding relevant term for a threshold time interval.

10. The apparatus of claim 7, wherein the program code are further configured to cause the apparatus to display, via the web interface, the customized content by:
    displaying a user interface element; and
    displaying one or more inventory pages in response to the user selecting a corresponding portion of the user interface element.

11. The apparatus of claim 10, wherein the program code are further configured to cause the apparatus to display the one or more inventory pages by:
  displaying an inventory page with a maximum sum of the one or more term search relevance scores that exceeds a term search relevance score threshold.

12. The apparatus of claim 7, wherein the program code are further configured to cause the apparatus to:
  identify additional information corresponding with the customized content;
  identify, based on the user identifier, a separate application linked to the user profile; and
  transmit, for display, the additional information to the separate application.

13. A computer program product comprising a non-transitory computer readable storage medium and computer program instructions stored therein, the computer program instructions comprising program instructions configured, upon execution to:
  identify one or more relevant terms on a webpage presented via a web interface, and wherein the web interface is configured for presentation to a user associated with a user profile;
  determine one or more user intents corresponding with the webpage;
  determine an interest indication score for each relevant term based at least in part on past user activity data of a similar user profile set associated with the user profile by comparing the user profile to a plurality of other user profiles to determine a similarity score for each of the plurality of other user profiles, and select the similar user profile set by comparing the similarity scores for each of the plurality of other user profiles to a user similarity threshold;
  determine a term search relevance score for each relevant term based at least in part on user actions associated with the user profile;
  determine a weighted combination score comprising the one or more term search relevance scores and the one or more interest indication scores; and
  if the weighted combination score exceeds a weighted combination score threshold,
    display, via the web interface, the customized content corresponding with the one or more relevant terms and the one or more user intents.

14. The computer program product of claim 13, wherein the program instructions are further configured, upon execution, to determine the similarity score for each of the plurality of other user profiles based at least in part on a number of shared webpage visitations associated with the user profile and the plurality of other user profiles.

15. The computer program product of claim 13, wherein the program instructions are further configured, upon execution, to identify the one or more relevant terms on the webpage by:
  receiving a user interest indication with respect to at least one of the relevant terms when a pointer interface element associated with the user profile is placed on a corresponding relevant term for a threshold time interval.

16. The computer program product of claim 13, wherein the program instructions are further configured, upon execution, to display, via the web interface, the customized content by:
  displaying a user interface element; and
  displaying one or more inventory pages in response to the user selecting a corresponding portion of the user interface element.

17. The computer program product of claim 16, wherein the program instructions are further configured upon execution, to display the one or more inventory pages by:
  displaying an inventory page with a maximum sum of the one or more term search relevance scores that exceeds a term search relevance score threshold.

* * * * *